United States Patent
Earley et al.

(10) Patent No.: US 11,280,607 B2
(45) Date of Patent: Mar. 22, 2022

(54) LASER LEVEL CHECKING

(71) Applicant: STAFF HOLDINGS PTY LTD, Melbourne (AU)

(72) Inventors: Ross Earley, Mentone (AU); Jason Andrew Byron, Bundoora (AU)

(73) Assignee: STAFF HOLDINGS PTY LTD, Melbourne (AU)

( * ) Notice: Subject to any disclaimer, the term of this patent is extended or adjusted under 35 U.S.C. 154(b) by 755 days.

(21) Appl. No.: 16/082,881

(22) PCT Filed: Mar. 8, 2017

(86) PCT No.: PCT/AU2017/050203
§ 371 (c)(1),
(2) Date: Sep. 6, 2018

(87) PCT Pub. No.: WO2017/152227
PCT Pub. Date: Sep. 14, 2017

(65) Prior Publication Data
US 2020/0300623 A1    Sep. 24, 2020

(30) Foreign Application Priority Data
Mar. 8, 2016    (AU) .............................. 2016900859

(51) Int. Cl.
*G01C 5/00* (2006.01)
*G01C 9/24* (2006.01)
*G01C 15/00* (2006.01)

(52) U.S. Cl.
CPC ................. *G01C 5/00* (2013.01); *G01C 9/24* (2013.01); *G01C 15/006* (2013.01)

(58) Field of Classification Search
CPC .......... G01C 5/00; G01C 9/24; G01C 15/006; G01C 15/06
(Continued)

(56) References Cited

U.S. PATENT DOCUMENTS 3,894,230 A    7/1975   Rorden et al.
4,029,451 A    6/1977   Farnia
(Continued)

FOREIGN PATENT DOCUMENTS

CN    101490505 A    7/2009
CN    105300350 A    2/2016
(Continued)

OTHER PUBLICATIONS

International Search Report from International Patent Application No. PCT/AU2017/050203, dated May 29, 2017.
(Continued)

*Primary Examiner* — Yaritza Guadalupe-McCall
(74) *Attorney, Agent, or Firm* — Greer, Burns & Crain, Ltd

(57) ABSTRACT

A laser receiving arrangement, co-operable with a reference plane defined by a laser transmitter, including a data storage device, a sensing arrangement, a logic arrangement and a user interface. The data storage device stores a respective desired elevation for each of a plurality of target points. The sensing arrangement senses the reference plane and produces an output indicative of an elevation of a selected target point relative to the reference plane. The logic arrangement is configured to receive from the data storage device the respective desired elevation of the selected target point, receive the output of the sensing arrangement, and produce an output based on at least the received elevation and the received output. The user interface is configured to produce an output interpretable by a user, based on the output of the logic arrangement and indicative of a deviation of the target point from its respective desired elevation.

12 Claims, 9 Drawing Sheets

(58) Field of Classification Search
USPC .......................................................... 33/290
See application file for complete search history.

(56) References Cited

U.S. PATENT DOCUMENTS

| | | | |
|---|---|---|---|
| 4,146,969 A | 4/1979 | Chaires | |
| 4,693,498 A | 9/1987 | Baugh et al. | |
| 4,693,598 A | 9/1987 | Sehr | |
| 5,294,970 A * | 3/1994 | Dornbusch | G01S 5/16 356/141.1 |
| 5,457,890 A | 10/1995 | Mooty | |
| 7,110,092 B2 * | 9/2006 | Kasper | G01C 15/002 356/4.01 |
| 7,679,727 B2 * | 3/2010 | Benz | G01S 17/875 356/4.01 |
| 7,866,052 B2 * | 1/2011 | Schulze | G01C 15/02 33/1 G |
| 7,966,739 B2 * | 6/2011 | Kamizono | G01C 3/00 33/290 |
| 8,087,176 B1 * | 1/2012 | Hayes | G01C 15/004 33/280 |
| 8,745,884 B2 * | 6/2014 | Hayes | G01C 15/006 33/280 |
| 9,146,106 B2 | 9/2015 | Bank | |
| 9,316,486 B2 * | 4/2016 | Neubauer | G01B 11/14 |
| 9,441,951 B1 * | 9/2016 | Vitaladevuni | G01C 3/00 |
| 10,209,059 B2 * | 2/2019 | Nagalla | G01B 21/047 |
| 2002/0098039 A1 | 7/2002 | Kieranen et al. | |
| 2008/0015811 A1 | 1/2008 | Conner et al. | |
| 2010/0123892 A1 * | 5/2010 | Miller | G01C 15/002 356/4.01 |
| 2010/0131237 A1 | 5/2010 | Pamatmat | |
| 2012/0198711 A1 * | 8/2012 | Hayes | G01C 15/004 33/228 |
| 2014/0205205 A1 * | 7/2014 | Neubauer | H01Q 1/125 382/291 |
| 2015/0056369 A1 | 2/2015 | Kohn | |
| 2015/0096180 A1 | 4/2015 | Johnson | |
| 2018/0120089 A1 * | 5/2018 | Nagalla | G01B 5/004 |
| 2018/0202805 A1 * | 7/2018 | Unger | G01C 3/08 |
| 2019/0361121 A1 * | 11/2019 | Forster | G01S 17/66 |
| 2020/0300623 A1 * | 9/2020 | Earley | G01C 9/24 |
| 2021/0190915 A1 * | 6/2021 | Snyder | G01S 17/08 |

FOREIGN PATENT DOCUMENTS

| | | | |
|---|---|---|---|
| EP | 1079029 A2 | 2/2001 | |
| JP | H07-306046 A | 11/1995 | |
| KR | 200463389 Y1 | 10/2012 | |
| WO | 01/65206 A2 | 9/2001 | |
| WO | WO-2017152227 A1 * | 9/2017 | ............ G01C 15/06 |

OTHER PUBLICATIONS

International Preliminary Report on Patentability from International Patent Application No. PCT/AU2017/050203, dated Jul. 12, 2018.

* cited by examiner

LASER LEVEL CHECKING

FIELD

This invention relates to laser level checking.

BACKGROUND

Laser level checking is a technique used on buildings sites and elsewhere to check the level of selected target sites.

The technique typically entails the use of a laser transmitter to define a reference plane. Commonly available transmitters produce a horizontal beam that rotates about a vertical axis to define the plane although it is also plausible that a transmitter may produce a static planar laser. The laser need not project in all directions from the transmitter although that is preferred.

When building a typical domestic dwelling, the transmitter will be placed in sight of a temporary bench mark (TBM). The TBM is a point selected by a surveying team and other levels about the building site are measured in terms relative to the TBM.

The method typically entails a laser receiving arrangement in the form of a staff and a photo detector carried by the staff. The staff is typically in the vicinity of 2 meters high and is not dissimilar to an oversized ruler in that it has indications of distance from one of its ends marked along its length. That one of the ends is a datum.

The photo detector is mounted to slide vertically along the staff and constitutes a sensing arrangement to sense the reference plane and produce an output indicative of alignment of the photo detector with a reference plane. Many existing photo detectors include a sensing arrangement in the vicinity of 50 mm high and are configured to, so long as they intersect the reference plane, provide an indication of whether the photo detector must be moved up or down until the detector is aligned (within a tolerance) with a reference plane.

To check the levels about the building site, the laser receiving arrangement is first calibrated by placing its datum on the temporary bench mark and then aligning the photo detector with the reference plane. The vertical position of the photo detector along the staff is then marked off on the staff, typically with a pencil mark.

The laser receiving arrangement is then moved to a target site the level of which is to be checked. The datum of the staff is placed on the target site and the photo detector again moved vertically along the staff until it is aligned with the reference plane. The vertical location of the photo detector relative to the pencil mark provides an indication of the elevation of the target site relative to the TBM. A builder would then typically review the building plan marked with the desired elevation of the target site and compare that number to the number just determined to determine whether the target site must be built up ('filled') or dug out ('cut') to achieve the desired level at the target site.

The process is tedious and complicated and includes ample opportunity for human error.

A search of patent literature reveals that attempts have been made to address some of these problems.

JP 07306046, U.S. Pat. Nos. 4,693,498 and 3,894,230 disclose long sensors having photo-sensitive portions fixed at mutually different distances from a datum to electronically sense the height of the reference plane above the target point.

JP 07306046 also discloses horizontally spaced photo-sensitive portions co-operable with a rotational beam laser transmitter so that a time difference between the activation of the photo-sensitive portions is indicative of the horizontal distance ('range') between the transmitter and the sensing arrangement.

US 2008/0015811 discloses a handheld device that, once suitably aligned with the reference plane, uses a laser distance measurement device to determine the height of the reference plane above the target point.

U.S. Pat. No. 5,457,890 discloses an electro-mechanical arrangement for automatically driving the photo detector up and down a staff. U.S. Pat. No. 4,029,451 discloses a similar electro-mechanical arrangement and determining the range by measuring the width of the laser beam.

Despite these various attempts to improve upon the typical laser receiving arrangement it nonetheless remains typical and the inventor has recognised that significant improvements over the typical laser receiving arrangement and the devices and methods of the mentioned patent literature are possible.

It is not admitted that any of the information in this patent specification is common general knowledge, or that the person skilled in the art could be reasonably expected to ascertain or understand it, regard it as relevant or combine it in any way before the priority date.

SUMMARY

One aspect of the invention provides a laser receiving arrangement, co-operable with a reference plane defined by a laser transmitter, including
  a data storage device on which a respective desired elevation for each of a plurality of target points is storable;
  a sensing arrangement configured to sense the reference plane and produce an output indicative of an elevation of a selected one of the target points relative to the reference plane;
  a logic arrangement configured to
    receive from the data storage device the respective desired elevation of the selected one of the target points,
    receive the output of the sensing arrangement, and
    produce an output based on at least the received elevation and the received output; and
  a user interface configured to produce an output interpretable by a user, based on the output of the logic arrangement and indicative of a deviation of the selected one of the target points from its respective desired elevation.

Preferably the output of the user interface is indicative of whether the selected one of the target points is above or below its desired elevation. The output of the user interface may be indicative of a vertical distance from the selected one of the target points to its desired elevation.

Another aspect of the invention provides a laser receiving arrangement, co-operable with a reference plane defined by a laser transmitter, including
  a sensing arrangement configured to sense the reference plane and produce an output indicative of an elevation of a target point relative to the reference plane;
  a data storage device for storing an elevation of a reference point relative to the reference plane;
  a logic arrangement configured to
    receive from the data storage device the elevation of a reference point relative to the reference plane,
    receive from the sensing arrangement the elevation of the target point relative to the reference plane, and
    produce an output based on at least the received elevations; and a user interface configured to, based on the output of the logic arrangement, produce an indication, of a vertical deviation of the target point from reference point, interpretable by a user.

The output of the user interface may be indicative of whether the selected one of the target points is above or below the reference point. Preferably the output of the user interface is indicative of a vertical distance from the selected one of the target points to its desired elevation.

The laser receiving arrangement may include a mobile telecommunications device defining the user interface. The laser receiving arrangement may include a mobile telecommunications device defining the data storage device, the logic arrangement and the user interface. Preferably the mobile telecommunications device wirelessly co-operates with the sensing arrangement.

The sensing arrangement preferably includes
   a staff including a datum for abutting the target point;
   one or more photo-sensitive portions movable up and down the staff; and
   a position sensing arrangement for, based on a position of the photo-sensitive portion(s), producing the output indicative of an elevation of a selected point relative to the reference plane.

Another aspect of the invention provides a laser system including the laser receiving arrangement and the laser transmitter.

Another aspect of the invention provides a computer program configured to cause a mobile telecommunications device to co-operate with a sensing arrangement to form a laser receiving arrangement co-operable with a reference plane defined by a laser transmitter;
   the sensing arrangement being configured to sense the reference plane and produce an output indicative of an elevation of a selected one of a plurality of target points relative to the reference plane;
   the computer program being configured to cause the mobile telecommunications device to define
     a data storage device on which a respective desired elevation for each of the plurality of target points is storable;
     a logic arrangement configured to
       receive from the data storage device the respective desired elevation of the selected one of the target points,
       receive the output of the sensing arrangement, and
       produce an output based on at least the received elevation and the received output; and
     a user interface configured to produce an output interpretable by a user, based on the output of the logic arrangement and indicative of a deviation of the selected one of the target points from its respective desired elevation.

Another aspect of the invention provides a computer program configured to cause a mobile telecommunications device to co-operate with a sensing arrangement to form a laser receiving arrangement co-operable with a reference plane defined by a laser transmitter;
   the sensing arrangement being configured to sense the reference plane and produce an output indicative of an elevation of a target point relative to the reference plane;
   the computer program being configured to cause the mobile telecommunications device to define
     a data storage device for storing an elevation of a reference point relative to the reference plane;
     a logic arrangement configured to
       receive from the data storage device the elevation of a reference point relative to the reference plane,
       receive from the sensing arrangement the elevation of the target point relative to the reference plane, and
       produce an output based on at least the received elevations; and
     a user interface configured to, based on the output of the logic arrangement, produce an indication, of a vertical deviation of the target point from reference point, interpretable by a user.

Another aspect of the invention provides a computer readable medium carrying the program.

Another aspect of the invention provides a mobile telecommunications device configured to co-operate with a sensing arrangement to form a laser receiving arrangement co-operable with a reference plane defined by a laser transmitter;
   the sensing arrangement being configured to sense the reference plane and produce an output indicative of an elevation of a selected one of a plurality of target points relative to the reference plane;
   the mobile telecommunications device being configured to define
     a data storage device on which a respective desired elevation for each of the plurality of target points is storable;
     a logic arrangement configured to
       receive from the data storage device the respective desired elevation of the selected one of the target points,
       receive the output of the sensing arrangement, and
       produce an output based on at least the received elevation and the received output; and
     a user interface configured to produce an output interpretable by a user and based on the output of the logic arrangement.

Another aspect of the invention provides a mobile telecommunications device configured to co-operate with a sensing arrangement to form a laser receiving arrangement co-operable with a reference plane defined by a laser transmitter; the sensing arrangement configured to sense the reference plane and produce an output indicative of an elevation of a target point relative to the reference plane;
   the mobile telecommunications device being configured to define
     a data storage device for storing an elevation of a reference point relative to the reference plane;
     a logic arrangement configured to
       receive from the data storage device the elevation of a reference point relative to the reference plane,
       receive from the sensing arrangement the elevation of the target point relative to the reference plane, and
       produce an output based on at least the received elevations; and
     a user interface configured to, based on the output of the logic arrangement, produce an indication, of a vertical deviation of the target point from reference point, interpretable by a user.

Another aspect of the invention provides a method, of checking the elevation of a target point, including
   utilising a laser receiving arrangement including a laser sensing arrangement;
   positioning the sensing arrangement to sense the reference plane and produce an output indicative of an elevation of a reference point relative to the reference plane;

causing the laser receiving arrangement to store the elevation of the reference point relative to the reference plane;

positioning the sensing arrangement to sense the reference plane and produce an output indicative of an elevation of the target point to the reference plane;

causing the laser receiving arrangement to, based on the elevation of the reference point and the elevation of the target point, produce an output indicative of a vertical deviation of the target point from the reference point and interpretable by a user.

Another aspect of the invention provides a staff, co-operable with a reference plane defined by a laser transmitter, including a sensing arrangement for sensing the reference plane;

one or more mounting point(s) to which an extension is releasably fittable to define a datum for abutting a target point;

an extension sensing arrangement for sensing at least the presence of an extension fitted to the mounting point(s);

a logic arrangement configured to, based on output from the sensing arrangement and on output from the extension sensing arrangement, produce an output indicative of an elevation of the reference plane above the target point.

The extension sensing arrangement is preferably configured to sense a length of an extension fitted to the mounting point(s). Most preferably the extension sensing arrangement is configured to sense a length of a series, of extensions, fitted to the mounting point(s).

The sensing arrangement preferably includes one or more photo-sensitive portions movable up and down the staff; and a position sensing arrangement for, based on a position of the photo-sensitive portion(s), producing the output from the sensing arrangement.

The extension sensing arrangement may include electrical contacts associated with the mounting point(s) to electrically connect the extension sensing arrangement to an extension fitted to the mounting point(s).

Another aspect of the invention provides a laser receiving arrangement including the staff; and a first extension for mechanically and electrically connecting the staff to a second extension that is identical to the first extension;

the first extension being co-operable with the mounting point(s) and contacts of the staff and defining further mounting point(s) and contacts co-operable a second extension.

Another aspect of the invention provides a laser receiving arrangement including the staff and an extension co-operable with the staff and configured to provide at least an indication of length to the extension sensing arrangement.

Another aspect of the invention provides an extension for a staff;

the staff being co-operable with a reference plane defined by a laser transmitter;

the extension being co-operable with another extension that is identical to the extension;

the extension including an elongate body;

top mounting point(s), and top electrical contacts, co-operable with mounting point(s), and electrical contacts, of the staff; and bottom mounting points, and bottom electrical contacts, co-operable with top mounting point(s), and top electrical contacts, of the other extension to mechanically and electrically connect the other extension to the staff.

The extension may include electrical means associated with the top electrical contacts for conveying to the staff information at least relatable to a length of the extension.

Also disclosed is a laser receiving arrangement, co-operable with a reference plane defined by a laser transmitter, including a data storage device in which a desired profile is storable;

a sensing arrangement configured to sense the reference plane and produce an output indicative of an elevation, of selected target point relative to the reference plane, and a distance of the selected target point from transmitter;

a logic arrangement configured to receive information, from the data storage device, and the output from the sensing arrangement; and produce an output based on at least the received information and the received output; and a user interface configured to produce an output interpretable by a user, based on the output of the logic arrangement and indicative of a deviation of the selected target point from the desired profile.

Also disclosed is a computer program configured to cause a mobile telecommunications device to co-operate with a sensing arrangement to form a laser receiving arrangement co-operable with a reference plane defined by a laser transmitter;

a sensing arrangement configured to sense the reference plane and produce an output indicative of an elevation, of a selected target point relative to the reference plane, and a distance of the selected target point from transmitter;

the computer program being configured to cause the mobile telecommunications device to define a data storage device in which a desired profile is storable;

a logic arrangement configured to receive information, from the data storage device, and the output from the sensing arrangement; and produce an output based on at least the received information and the received output; and a user interface configured to produce an output interpretable by a user, based on the output of the logic arrangement and indicative of a deviation of the selected target point from the desired profile.

Also disclosed is a computer readable medium carrying one of the computer programs.

Also disclosed is a mobile telecommunications device configured to co-operate with a sensing arrangement to form a laser receiving arrangement co-operable with a reference plane defined by a laser transmitter;

the sensing arrangement being configured to sense the reference plane and produce an output indicative of an elevation, of selected target point relative to the reference plane, and a distance of the selected target point from transmitter;

the mobile telecommunications being configured to define a data storage device in which a desired profile is storable;

a logic arrangement configured to receive information, from the data storage device, and the output from the sensing arrangement; and produce an output based on at least the received information and the received output; and a user interface configured to produce an output interpretable by a user, based on the output of the logic arrangement and indicative of a deviation of the selected target point from the desired profile.

BRIEF DESCRIPTION OF THE DRAWINGS

Embodiments of the disclosed apparatus and methods will now be described by way of example only with reference to the accompanying drawings in which:

FIGS. 5 to 24 are screen shots of a preferred user interface; and

FIGS. 25 and 26 schematically illustrate the use of a laser level-checking system to check/set the levels for a first floor.

DETAILED DESCRIPTION

Figure 1:
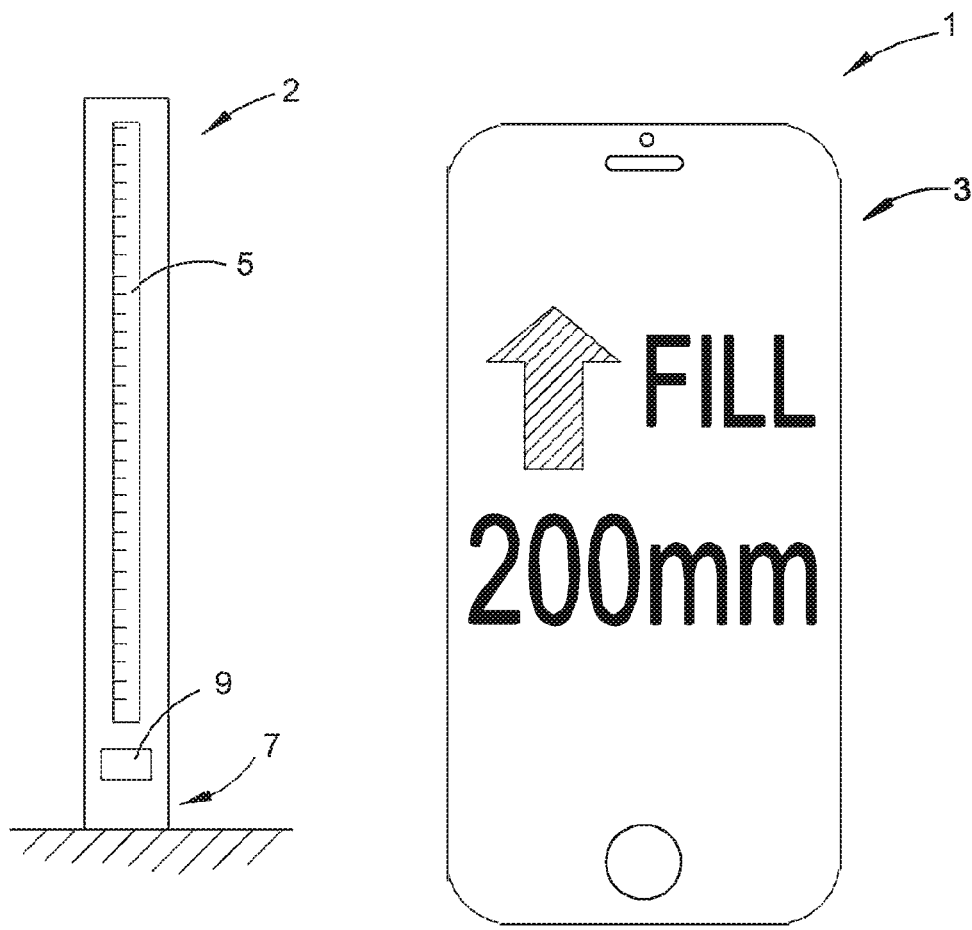
FIG. 1 schematically illustrates a laser receiving arrangement.

The following examples are intended to illustrate to enable reproduction and comparison. They are not intended to limit the scope of the disclosure in any way.

The laser receiving arrangement 1 includes a staff 2 and a mobile telecommunications device (MTD) 3.

The staff 2 is about 2 metres high and includes a sensing arrangement 5 running vertically along its length. The bottom end of the staff is a datum 7. In use the datum 7 is placed on a selected target site on the ground the level of which is to be checked. The staff is then held upright. For this purpose the staff may include a mechanism for checking verticality of the staff such as a bubble trapped within a suitable transparent housing.

The sensing arrangement 5 is made up of photosensitive portions at respective distances from the datum 7. These portions are responsive to a laser defining a laser reference plane. Thus the distance of the responsive one of the portions from the datum 7 corresponds to the height of the reference plane above the target point.

The staff 2 incorporates a transmitter 9 for wirelessly transmitting the elevation, of the reference plane above the target point, to the MTD 3.

The MTD 3 is configured by a computer program, known as an app, downloaded from an on-line environment. The computer program configures the MTD 3 to store a desired elevation for each of a plurality of target sites along with a respective identifier for each of the target sites. The identifier could be descriptive text such 'garage 1' and 'garage 2' or something more elaborate. Optionally the identifier could be a set of navigational co-ordinates whereby the computer program can configure the mobile phone to enable a target site to be selected by moving the mobile phone into proximity with the target site. Preferably, the identifier is simply a number corresponding to a number marked for the target site on a building plan.

The mobile phone can be preloaded with the desired elevation for each target site in the comfort of an office environment before arriving on the building site. This alone reduces the prospects of human error.

Upon arrival at the building site the user positions the laser transmitter within sight of the TBM and the target sites in conventional fashion. The datum 7 is then placed on the TBM. Often the TBM will be clearly marked such as by a dot of spray paint on the footpath at the front of the building site. With the staff held upright, a reference elevation can be captured. For this purpose, the MTD 3 is preferably configured by the computer program to present an intuitive call for action via its user interface. Preferably the MTD's touch screen presents an icon clearly labelled 'capture reference' or similar. In an alternate variant of the arrangement 1, the staff 2 incorporates its own calibration facility by which the reference value can be captured so that the subsequent output from the staff is adjusted by this value.

Once the operator has operated the MTD to capture the reference elevation they can move on to a first of the target sites. The datum 7 is placed on the first target site and the staff is held upright. The operator selects, via the touch screen of the MTD 3, the first target site, e.g. by pressing a icon clearly marked 'target site 1' or similar.

The MTD, as configured by the downloaded program, then compares at least the elevation received from the staff 2 and the desired elevation to assess the deviation between the target site's elevation and its desired elevation. Typically the reference elevation will also be factored into the comparison, although it is plausible that the transmitter could be set at the same height as the TBM, or that the desired elevations include an allowance for a predetermined reference elevation to which the transmitter is set.

Preferably the desired elevations are stored as elevations relative to the height of the TBM, in which case the output from the staff 2 is preferably modified by the subtraction of the reference elevation before it is compared to the desired elevation. By way of example, the modified output from the staff 2 may indicate that the target site is measured at 100 mm above the TBM and the desired elevation for that site may be 300 mm above the TBM in which case a comparison, of the output of staff 2 in its modified form to the desired elevation, in the form of subtraction indicates that the target site must be built up by 200 mm.

Alternatively the output from the staff 2 may be directly compared to a modified form of the desired elevation, the modified form of the desired election being the addition of the reference elevation and the desired elevation of the target site relative to the TBM.

The MTD 3, as configured by the program, preferably displays the necessary action to achieve the desired elevation. In the example of FIG. 1 the MTD 3 conveys via its screen an up arrow and the word 'fill' conveying the direction of the necessary surface modifications. Both the arrow and the word fill are indicative of the target point being below its desired elevation. The screen further conveys a simple numeric output indicating that the ground must be built up by 200 mm. The operation of the laser receiving arrangement 1 on site is thus simple and intuitive, and minimises the opportunity for human error. The MTD may be configured to store the deviation from the desired elevation for later reference.

Figure 2:
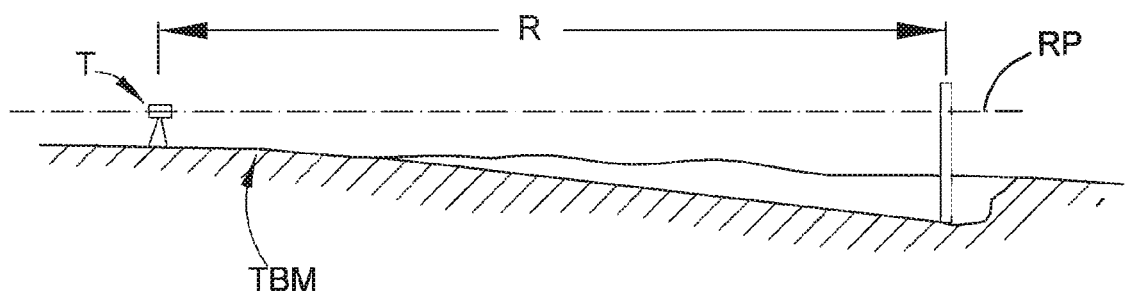
FIG. 2 is a vertical cross-section view along the centre line of a drainage trench.

It is frequently desirable to build inclined features. A drainage trench is a simple example of such a feature. FIG. 2 illustrates a drainage trench partially constructed with the aid of the laser receiving arrangement 1 in which the MTD 3, as configured by the program, is operating in another operating mode. In this other operating mode rather than storing elevations for pre-selected target points, the MTD 3 stores a desired profile for the inclined feature.

The transmitter T is positioned along the centre line of the planned trench. The staff 2 is then placed on the TBM and a referenced range and elevation captured, preferably using appropriate capture icons on the touch screen. In this example the staff 2 is configured to also provide an output indicative of the range R of the staff 2 from the transmitter T. By way of example this range of measurement may be based on the width of the laser beam or the time that it takes for a laser beam to pass between horizontally spaced sensing portions of the staff 2.

Through a comparison process similar to that previously described, the MTD compares the output from the staff 2 to the desired profile to indicate whether the site at which the staff is placed is above or below the desired profile and how far from the desired profile the selected point is. In this way the staff can be dropped into the drainage trench whilst an excavator is momentarily paused to very rapidly provide an indication as to whether the excavation is on course. A site is selected as a target site by simply placing the datum 7 upon it. A simple intuitive output is provided without any need for specific user input whilst the excavator is paused.

In the described examples the MTD 3 is configured to define a data storage device, a logic arrangement and a user interface although of course other examples of the invention are possible. Using a MTD in this way is preferred in that most users will have an MTD with them and by utilising its processing power and other resources the costs of duplicating those resources in the staff arrangement 2 can be avoided, although other variants of the invention may well have such features built into the staff. It is also possible that various components of the receiving arrangement may be distributed. By way of example the MTD 3 may communicate via the internet with an off-site data storage device and logic arrangement.

Figure 3:
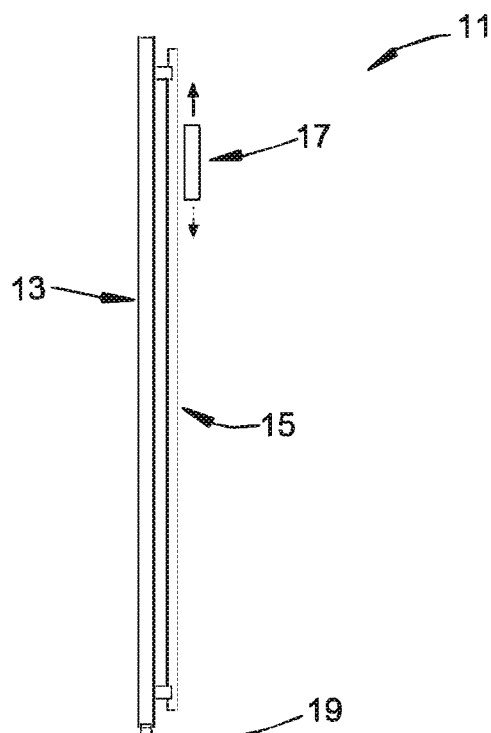
FIG. 3 schematically illustrates a staff.
Figure 4:
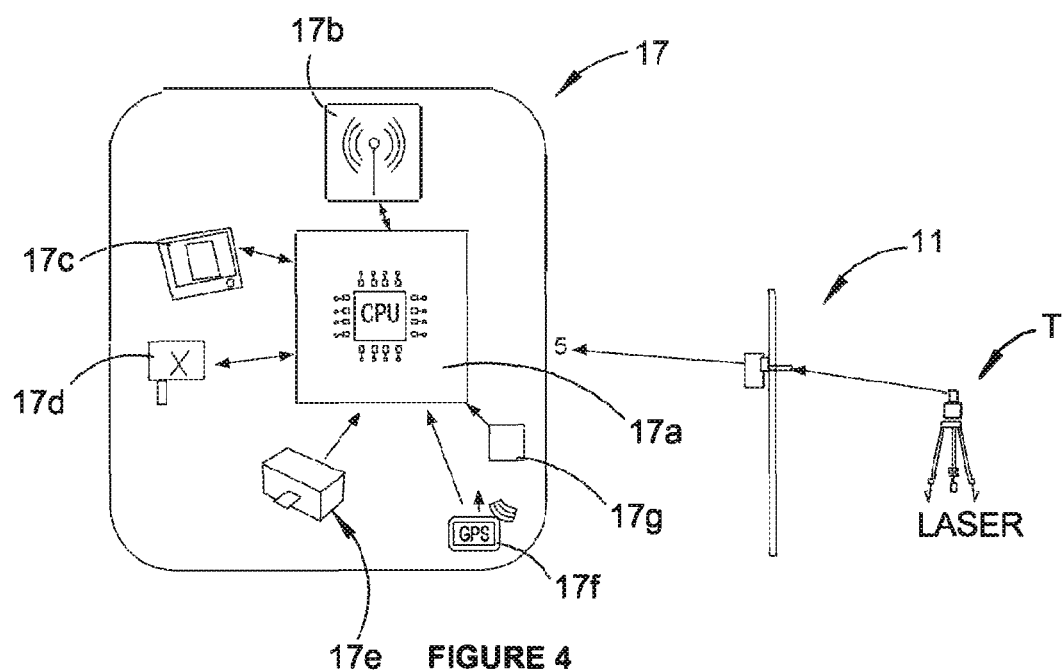
FIG. 4 schematically illustrates a laser level-checking system.
Figures 5, 6:
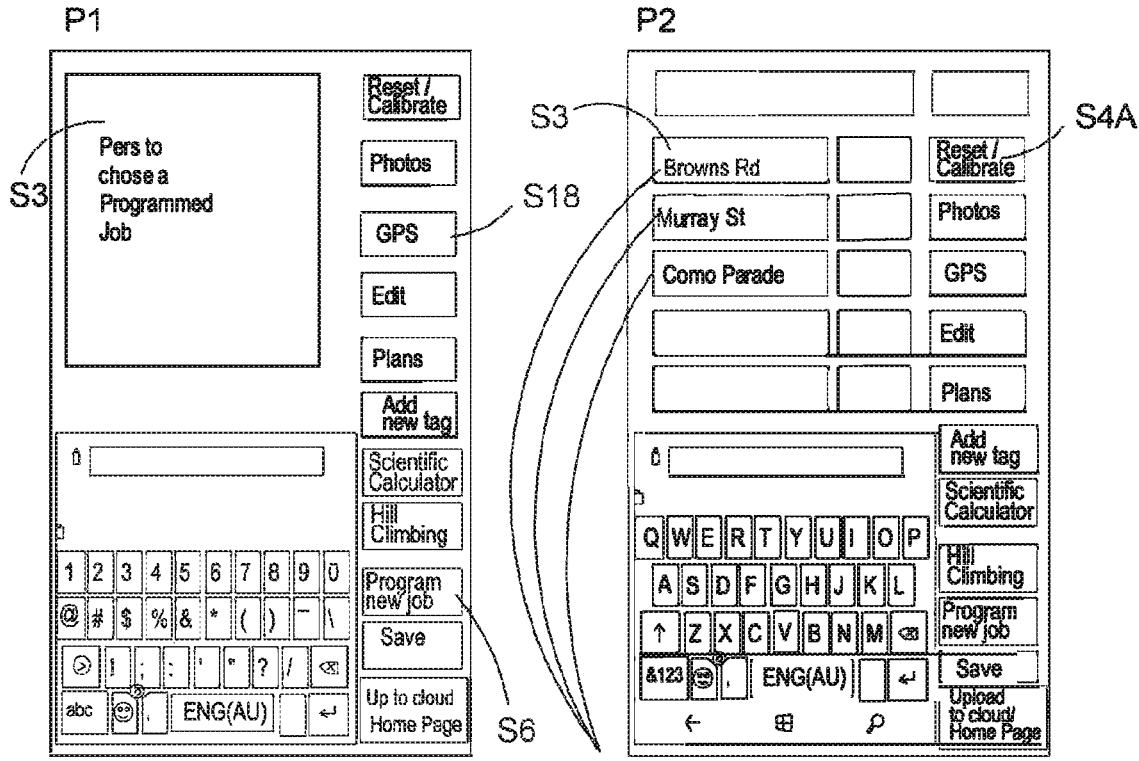
Figures 7, 8:
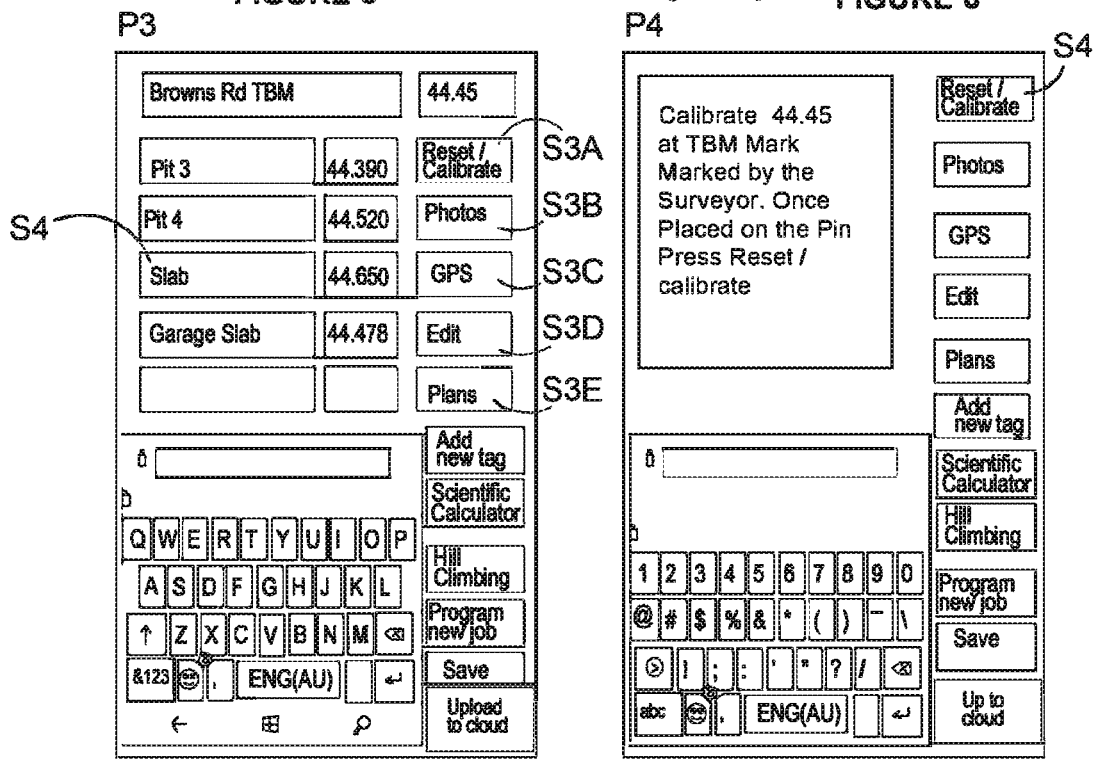
Figure 9:
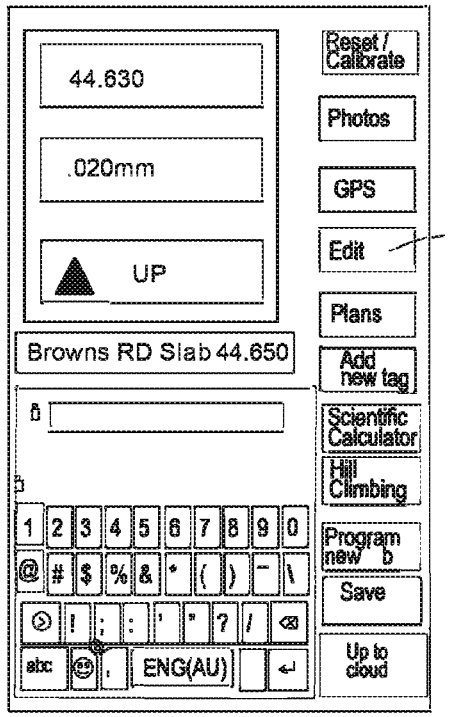
Figure 10:
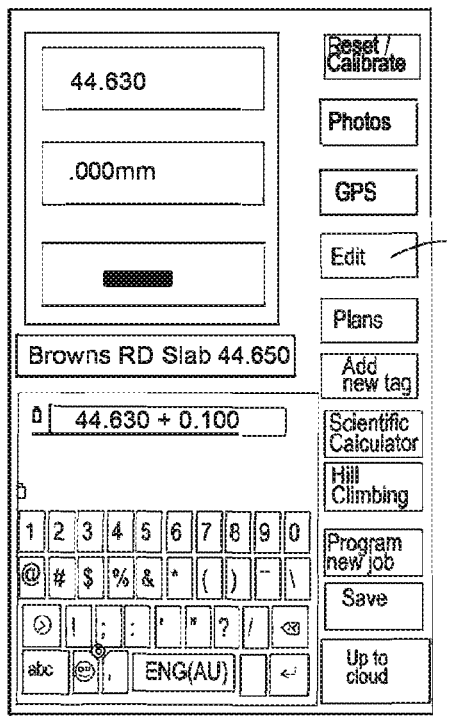
Figure 11:
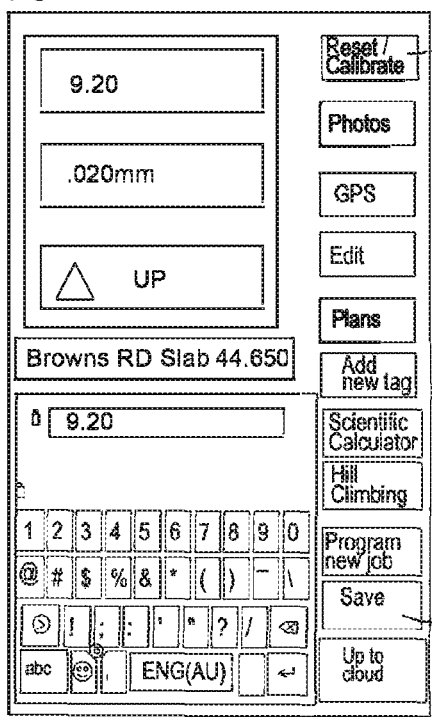
Figure 12:
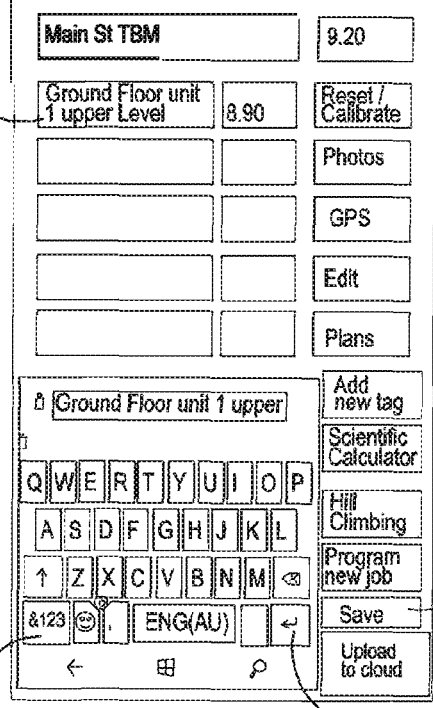
Figure 17:
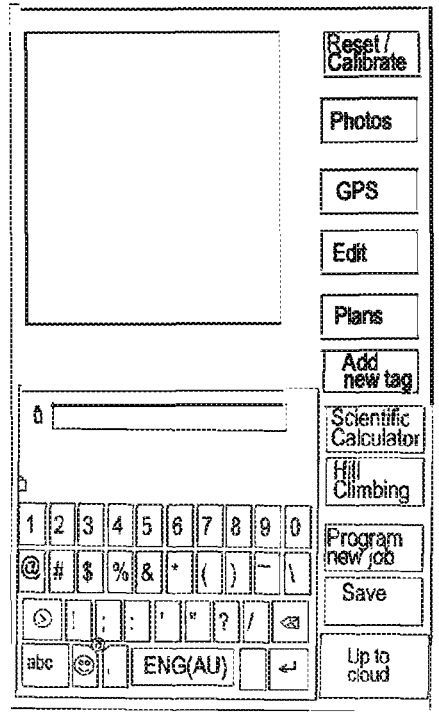
Figure 18:
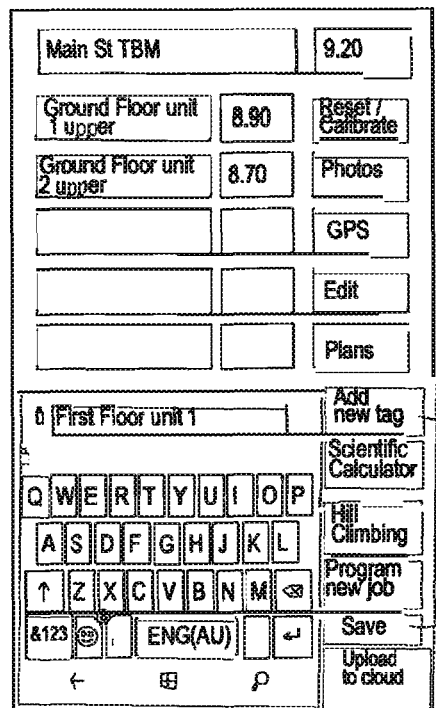
Figure 19:
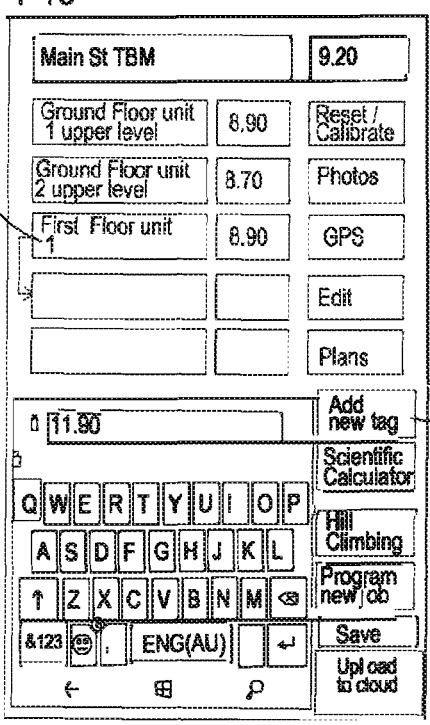
Figure 20:
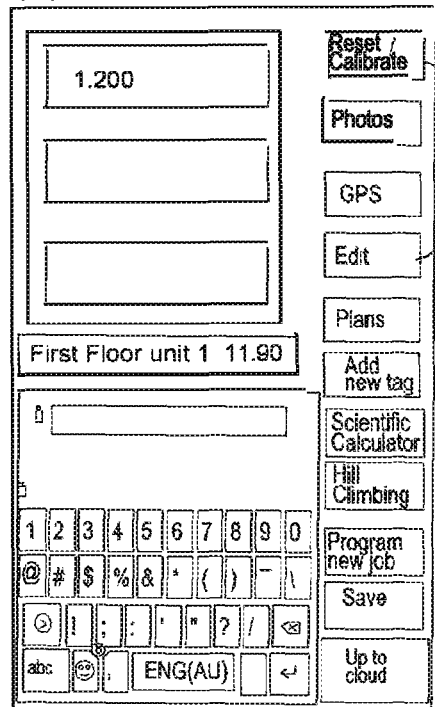
Figure 21:
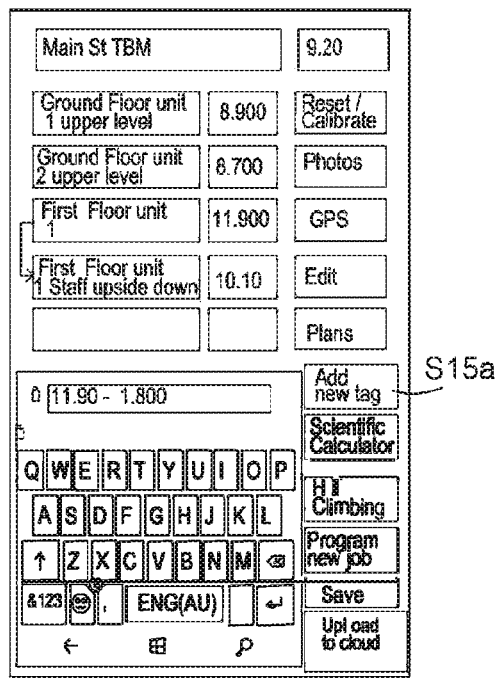

FIG. 3 illustrates an alternate laser receiving staff 11 including a staff body 13 and a scale 15 carried by the body 13. The staff further includes a module 17 movable up and down the body 13. At the base of the body 13 is a connection arrangement 17 including mounting points and electrical connections by which the staff 11 is mechanically and electrically connectable to an extension piece.

The module 17 co-operates with a logic arrangement 17a (that includes a CPU), an antenna 17b for forming a wireless link with outside devices, a screen 17c for displaying information to users, a position sensing arrangement 17d, a magnetometer 17e for staff compensation and a GPS antenna 17f, and a laser detector 17g for sensing the reference plane. Ideally the staff should be held exactly vertically upright when in use although the staff includes the magnetometer 17e to enable it to compensate for any angle away from the vertical to provide a more accurate reading to the end user. A tilt sensor such as an accelerometer may be employed to similar effect.

The position sensing arrangement 17d may take the form of a capacitive reader head co-operative with the scale 15 to sense the position of the module 17. An encoder is another option.

Proprietary scale and capacitive reader head combinations are available and are preferred for cost efficiencies. Preferably the remainder of the module 17 depends from the reader head 17d.

In use, the module 17 is manually moved up and down the staff until satisfactorily aligned with the reference plane. To assist with this alignment, the logic arrangement 17a, responsive to the detector 17g, may produce an output (e.g. an audible or visual output) to inform the operator of satisfactory alignment. When the module 17 is so aligned, the output from the position sensing arrangement 17d is indicative of the elevation of the reference plane above the point on which the base 19 is seated. A drive arrangement by which the module 17 is driven vertically along the staff to automatically locate the reference plane is also contemplated.

The module 17 preferably further includes a general purpose 10 to accommodate calibration inputs, at height indication, Wi-Fi connection, etc.

According to a preferred form of the invention, up to three 1000 mm staff extensions can be added to the lower section 19 of the main staff. This is to allow for sites that have a fall of more than the maximum length of the linear scale.

The main electronics 17a will automatically detect how many extensions are present and auto compensate on the final readings, this will eliminate any possible operator error and ensure data integrity.

The auto detection is achieved by deploying a loop back system into the staff. There will be 2 contacts that loop a signal back to the main CPU, when an extension is fitted this loop back will be moved to the lower section of the extension and a unique code is sent to the main CPU so it can adjust accordingly. The same applies for the other 2 extensions each one or any combination of extensions or no extensions will produce a unique code.

There are other mechanisms by which the addition of one or more extension pieces may be automatically recognised. By way of example, each extension piece might be tagged with a simple 2-bit passive RFID tag for providing a back-scattered signal (in response to a suitable excitement provided by the staff 11) by which the logic arrangement 17a can recognise the extension as being one of four predetermined lengths.

FIGS. 5 to 24 are screenshots from a mobile telecommunications device MTD configured with a suitable app to co-operate with the module 17 via the antenna 17b, e.g. via Bluetooth connection.

P1 Home Page

This page contains a display screen that provides readings of the horizontal beam. It also contains up to 11 other various options that assist the user to program, set heights and levels for up to 20 sites/locations.

Selection S2

Saved jobs will be displayed on page 2: Preprogrammed jobs. These can be programmed off site using the plans and the TBM reading that is given from the surveyor.

Selection S6

This will allow the user to program the level/FFL (Finished Floor Level) from the TBM.

Selection S18

This function allows the user to obtain a GPS reading and for it to be saved to a specific site/location. This function can also be used as a GPS in general terms for the user to navigate between sites/locations that are already saved in the staff.

P2 Preprogrammed Jobs

This page has the capability to save up to 20 preprogrammed jobs by the touch of the screen. Simply select the job that is required. For example Browns Rd.

Selection S3

Once the user selects the required site/location, for example Browns Rd, the preprogrammed heights will appear.

Selection S3A

The laser transmitter (aka laser level) may be moved about the work site as required (e.g. to have a light of sight to each of the TBM and a target site as required). As such, it is important that the laser-receiving arrangement is periodically recalibrated. This is achieved by placing the staff at the temporary benchmark and making the touchscreen selection S3A. In this way, the height of the reference plane relative to the temporary benchmark is captured and stored on the mobile telecommunications device.

P3 Preprogrammed Measurements Associated with the Selected Site/Location

All the measurements associated with, for example, Browns Rd, are listed on this page once they have been entered via S6 on home page.

Selection S38

This function allows the user to review previously taken photos along with taking new images of the desired site/location and then gives the user the ability to store the images under the site/locations file.

Selection S3C

This function allows the user to obtain a GPS reading and for it to be saved to a specifically to a site/location. This function can also be used as a GPS in general terms for the user to navigate between sites/locations that are already saved in the staff.

Selection S3D

This function allows the user to edit, add or change levels on site but this is protected by a PIN (or other suitable lock-out feature) so that levels cannot be altered by mistake.

Selection S3E This function allows the user to view plans for the associated site/location.

Selection S4

Allows the user to select height of concrete slab/ground floor. The TBM will need to calibrate at the TBM marked by the surveyor before use.

P4 Recalibration Page

Once the user has selected the required target site from P3, they will then be prompted to recalibrate the staff/level from the TBM every time as the horizontal beam will not be in the same place/height every time. Once the user has set the laser level up, they will then need to place the staff over the TBM and press the reset button to take the reading. Once this had been done, the selected height will appear and the staff is ready to use. If at any time the laser level is moved, the user will have to recalibrate the staff.

Selection S4A

The staff is recalibrated by selecting this option, which will find the horizontal laser beam automatically. Once the laser is centred to the beam it will alert the user that it has completed calibration by beeping. Select save and the selected level will appear for use.

P4a Saved Slab Level Page

This page will display the selected level, in this case the slab. The preprogrammed height reading will also appear in the middle of the display screen along with an indication of the amount and direction of the deviation from the preprogrammed height. In this case the amount and direction are respectively 0.02 mm and up.

Selection S5

This function allows the user to edit, add or change levels on site but this is protected by a PIN so that levels cannot be altered by mistake.

P5 Edit Preselected Measurements Page

This page is where the selected levels can be edited, added to or changed. For example, if you need to add a polished topping slab, by using the keyboard type in TOPPING SLAB and select save.

Selection S9

This function allows the user to save the new level. When the slab level is adjusted the measurements will appear in the calculator on P9. Once save is selected, the previous slab level will appear in the calculator ready for the new height to be added. Select save to make sure details are obtained. Once measurements are saved, the new level will appear on P3 ready for use.

P6 Onsite Programming: Creating New Job

To start you must enter the TMB into the staff and save it before calibrating the staff from the TBM at the front of the job or the measurements provided by the surveyor. These details can also be manually entered using the calculator.

Selection S7

This function allows the user to save the TBM to a new job page by using the keyboard type the desired name of the site/location.

Selection S7A

This function allows the user to enter new levels associated with a site/location whilst onsite. Before this can be done, the staff may need to be calibrated to the TBM. Once the user enters the new levels into the staff and selects save, it is then ready for use.

P7 Onsite Programming: Adding New Heights

Once the TBM reading is saved a new tab can be selected. Then, using the keyboard, title the new height, select save and add the ground floor height from the plans.

Option 1

By using the surrounding measurements, the calculator can be used to adjust selected heights or requirements. Use the TBM to manually select the desired height by adding or subtracting from the TBM height set by the surveyor.

Option 2

Enter the finished floor level as per plans and select save.

P8 Onsite Programming: Adding New Heights (Cont'd)

This page allows the user to program split floor levels into the staff.

Selection S11

This function allows the user to directly enter floor measurements off the plan and into the staff by using the calculator and then the keyboard by giving the level a name if needed.

P9 Edit Preprogrammed Measurements

This page shows the user all the previously saved information for a particular site/location. It also allows the user to add new heights by the 'Add new tag'.

Selection S10

This function allows the user to save the new height associated to a particular site/location by using the 'Add new tag'. For example, the user will see the job Browns Rd at the top of the page and all of the previously saved measurements below. If the user was wanting to add in a topping slab on top of the structural slab, the user would enter the measurements of the structural slab height and the thickness of the topping slab into the calculator, selecting enter and save, then the measurements will appear below the previously saved measurements.

P10 Preprogrammed Measurements Associated with the Selected Site/Location

This page shows the user all the measurements associated with a selected site/location. For example, all the measurements for Browns Rd are listed on this page, once they have been entered via S6 or S10.

P11 Onsite Programming: Creating New Heights

This page shows the user all the previously saved information for a particular site/location. It also allows the user to add new heights by the 'Add new tag'. Pages 11 and 12 are bridging steps for sites with split level floors.

Enter

Selecting 'Enter' switches by the keypad from letters (PII) to numbers (PIIA).

Selection S12

This function allows the user to enter new levels associated with a site/location whilst onsite (as per S10).

Selection S12A

This function allows the user to save the new height to the 'Add new tag' (as per S10).

P12 Onsite Programming: Creating New Heights (Cont'd)

This page shows the user all the previously saved information for a particular site/location. It also allows the user to add new heights by the 'Add new tag'. Pages 11 and 12 are bridging steps for sites with split level floors.

Selection S13

This function allows the user to enter new levels associated with a site/location whilst onsite (as per S10).

Selection S13a

This function allows the user to save the new height to the 'Add new tag' (as per S10).

P13 Onsite Programming: Creating New Heights (Cont'd)

This page provides the user with the steps to obtain a level that is above the horizontal beam. The user will enter the height off the plans first, in this case the first floor unit 1, by selecting 'Add new tag' and following steps as per S10.

Selection S14

This function 'Hill climbing/Measurement link' is selected when the user is attempting to get a height that is out of reach of the horizontal beam. The first step is to press 'Hill climbing/Measurement link' and then select the name of the height that is out of reach of the horizontal beam.

P14 Onsite Programming: Creating New Heights (Cont'd)

This page will display the selected level, in this case the first floor unit 1. The preprogrammed height reading will also appear in the middle of the display screen.

Selection S15

Selecting the 'Edit' and 'Reset/Calibrate' tabs will allow the user to take a reading to find the height of the horizontal beam. In this case the user will use the slab to get the height of the horizontal beam. The staff is calibrated by selecting this option, which will find the horizontal laser beam automatically. Once the laser is centred to the beam it will alert the user that it has completed calibration by beeping. Select save and the distance from the selected height from the slab to the horizontal beam will appear.

Figure 25:
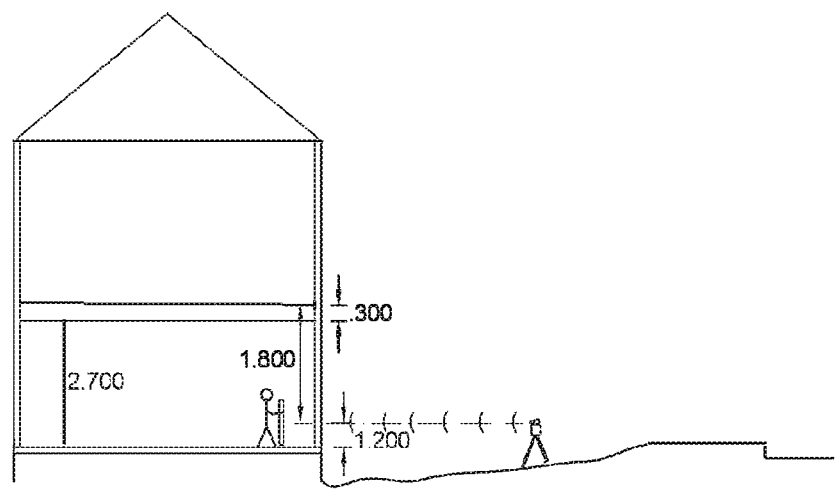

P15 Onsite Programming: Creating New Heights (Cont'd) (as Per FIG. 25)

All the measurements associated with, for example, Main St are listed on this page. The user now knows that from the slab unit 1 to the horizontal beam is 1.200 m. From the plan you can calculate that from the slab to the top of the first floor is 3 m. By using basic math, you subtract 1.200 m from 3 m and you are left with 1.800 m which is the distance left to the horizontal beam to the first floor.

Selection S16

This function allows the user to save the new height associated to a particular site/location by using the 'Add new tag'. The measurements will appear below the previously saved measurements. By using the keyboard, type in the name of the new height, then select enter on the keyboard and the user will be able to switch to the calculator. For example, enter the height of the first floor unit 1 into the calculator, then subtract the 1.800 m. Once this is completed, select save and the new height will appear below the previously saved measurements.

P16 Using Preprogrammed Measurements Online

This page contains all the preprogrammed heights associated with a particular site/location.

Selection S17

Allows the user to select height of the 'First floor unit 1 staff upside down'. The TBM will need to be calibrated at the TBM marked by the surveyor before being used again.

Figures 22, 23, 26:
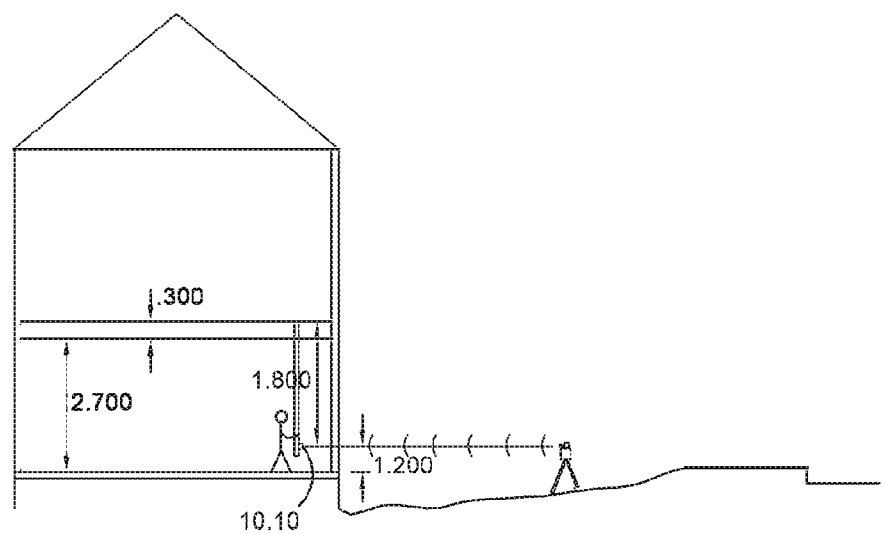

P17 Use of Staff Onsite Whilst Using 'First Floor Unit 1 Staff Upside Down' (as Per FIG. 26)

This page will display the selected level, in this case the 'First floor unit 1 staff upside down'. The preprogrammed height reading will also appear in the middle of the display screen.

P18 GPS/NAVIGATION This page will display the GPS location and navigation to the next site/location.

As per S18 on page 1.

Figure 24:
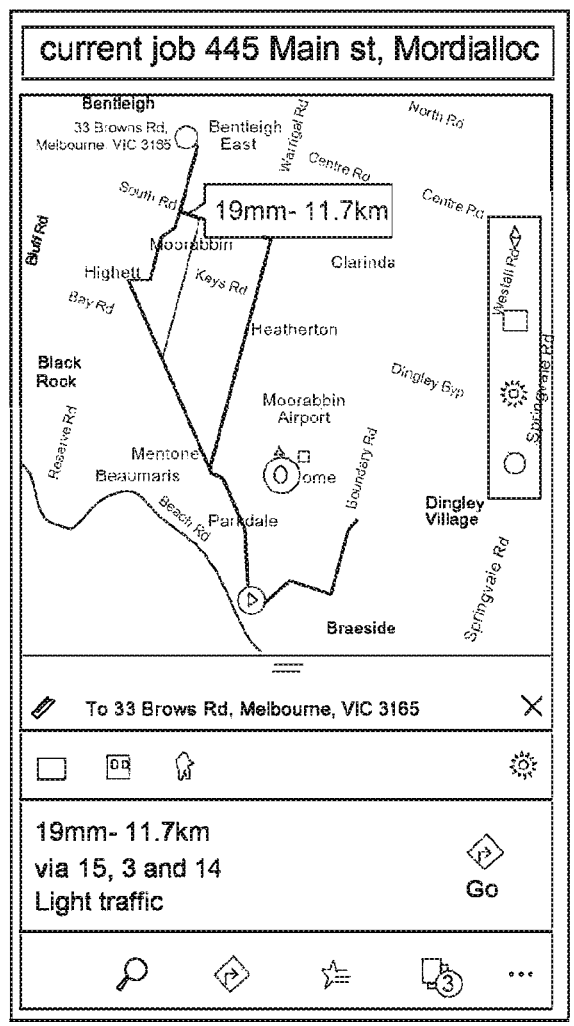

As suggested in FIG. 24, the software can assist operators with navigation between job sites. The GPS function can also be helpful on site. On the job site, the selection of target sites at page 3 (FIG. 7) may be guided or even automated with the aid of GPS. In a guided variant, the GPS antenna of the mobile telecommunications device or of the module 17 may be employed to provide an indication of which of the preset target sites is in proximity to the receiving arrangement. By way of example, when the staff 11 is moved to within a tolerance of the 'pit 4' target site, the pit 4 button of the touchscreen may illuminate, making it available for selection. In this way, the selection of the appropriate site is guided, reducing the risk of on site errors.

The present inventors have recognised that GPS signals taken within a limited timeframe often have a systematic error of a meter or two in one direction or another. To account for this systematic error, a calibration process is contemplated. By way of example, when the selection S3A is made with the staff 11 at the TBM, the GPS signal may be captured to obtain an estimate of the systematic error. That estimate can then be used to adjust subsequent GPS readings. Optionally, the system may demand periodic recalibration, e.g. every half hour or so. Of course, the described method of compensating for the systematic error in GPS signals may well be advantageously applied to laser level checking arrangements beyond those described herein. Indeed, it may well be applied beyond the context of laser level checking.

Various examples have been described. The invention is not limited to these examples. Rather, the invention is defined by the claims.

The invention claimed is:

1. A laser receiving arrangement, co-operable with a reference plane defined by a laser transmitter, comprising:
   a data storage device on which a respective desired elevation for each of a plurality of target points is storable; and
   a sensing arrangement configured to sense the reference plane and produce an output indicative of an elevation of a selected one of the target points relative to the reference plane;
   a logic arrangement configured to:
      receive from the data storage device the respective desired elevation of the selected one of the target points;
      receive the output of the sensing arrangement; and
      produce an output based on at least the received elevation and the received output;
   a user interface configured to produce an output interpretable by a user, based on the output of the logic arrangement and indicative of a deviation of the selected one of the target points from its respective desired elevation; and
   wherein the sensing arrangement includes:
   a staff including a datum for abutting the target point;
   one or more photo-sensitive portions movable up and down the staff; and a position sensing arrangement for, based on a position of the photo-sensitive portion(s), producing the output indicative of an elevation of the selected one of the target points relative to the reference plane.

2. The laser receiving arrangement of claim 1 wherein the output of the user interface is indicative of whether the selected one of the target points is above or below its desired elevation.

3. The laser receiving arrangement of claim 1 wherein the output of the user interface is indicative of a vertical distance from the selected one of the target points to its desired elevation.

4. The laser receiving arrangement of claim 1 including a mobile telecommunications device defining the user interface.

5. The laser receiving arrangement of claim 1 including a mobile telecommunications device defining the data storage device, the logic arrangement and the user interface.

6. A laser receiving arrangement, co-operable with a reference plane defined by a laser transmitter, comprising:
   a sensing arrangement configured to sense the reference plane and produce an output indicative of an elevation of a target point relative to the reference plane;
   a data storage device for storing an elevation of a reference point relative to the reference plane;
   a logic arrangement configured to:
     receive from the data storage device the elevation of a reference point relative to the reference plane;
     receive from the sensing arrangement the elevation of the target point relative to the reference plane; and
     produce an output based on at least the received elevations;
   a user interface configured to, based on the output of the logic arrangement, produce an indication, of a vertical deviation of the target point from reference point, interpretable by a user; and
   wherein the sensing, arrangement includes:
   a staff including a datum for abutting the target point;
   one or more photo-sensitive portions movable up and down the staff; and
   a position sensing arrangement for, based on a position of the photo-sensitive portion(s), producing the output indicative of an elevation of the target point relative to the reference plane.

7. The laser receiving arrangement of claim 6 wherein the output of the user interface is indicative of whether the target point is above or below the reference point.

8. The laser receiving arrangement of claim 6 wherein the output of the user interface is indicative of a vertical distance from the target point to the reference point.

9. The laser receiving arrangement of claim 6 including a mobile telecommunications device defining the user interface.

10. The laser receiving arrangement of claim 9 wherein the mobile telecommunications device wirelessly co-operates with the sensing arrangement.

11. The laser receiving arrangement of claim 6 including a mobile telecommunications device defining the data storage device, the logic arrangement and the user interface.

12. The laser receiving arrangement of claim 11 wherein the mobile telecommunications device wirelessly co-operates with the sensing arrangement.

* * * * *